US007756533B2

(12) United States Patent
Mahini et al.

(10) Patent No.: US 7,756,533 B2
(45) Date of Patent: Jul. 13, 2010

(54) MOBILE TERMINALS WITH MEDIA TUNING AND METHODS AND COMPUTER PROGRAM PRODUCTS FOR OPERATING THE SAME

(75) Inventors: Hassan Mahini, Carrboro, NC (US); Vikram Gupta, Raleigh, NC (US)

(73) Assignee: Sony Ericsson Mobile Communications AB, Lund (SE)

(*) Notice: Subject to any disclaimer, the term of this patent is extended or adjusted under 35 U.S.C. 154(b) by 744 days.

(21) Appl. No.: 11/205,799

(22) Filed: Aug. 17, 2005

(65) Prior Publication Data

US 2007/0042710 A1 Feb. 22, 2007

(51) Int. Cl.
*H04W 4/00* (2009.01)
(52) U.S. Cl. ............... 455/466; 455/41.2; 455/418; 455/419
(58) Field of Classification Search ............... None
See application file for complete search history.

(56) References Cited

U.S. PATENT DOCUMENTS

| 6,301,484 | B1 | 10/2001 | Rogers et al. |
| 2002/0023264 | A1* | 2/2002 | Aaltonen et al. ............... 725/62 |
| 2002/0059596 | A1 | 5/2002 | Sano et al. ............... 725/39 |
| 2003/0220114 | A1* | 11/2003 | Langensteiner et al. ..... 455/450 |
| 2004/0146031 | A1 | 7/2004 | Jukarainen |
| 2004/0172561 | A1 | 9/2004 | Iga ............... 713/201 |
| 2004/0198279 | A1 | 10/2004 | Anttila et al. ............ 455/179.1 |
| 2004/0203338 | A1 | 10/2004 | Zilliacus .................... 455/3.04 |
| 2004/0203729 | A1 | 10/2004 | Makipaa et al. .......... 455/426.1 |
| 2004/0248561 | A1 | 12/2004 | Nykanen et al. ......... 455/414.2 |
| 2005/0091689 | A1 | 4/2005 | Lee ............... 725/62 |
| 2005/0120305 | A1 | 6/2005 | Engstrom et al. |
| 2006/0009155 | A1* | 1/2006 | Paalasmaa et al. ......... 455/41.2 |
| 2006/0030263 | A1* | 2/2006 | Seligmann et al. ......... 455/41.2 |
| 2006/0161662 | A1* | 7/2006 | Ng et al. .................... 709/227 |

FOREIGN PATENT DOCUMENTS

| EP | 1 255 383 A2 | 11/2002 |
| JP | 2001-333411 A | 11/2001 |
| JP | 2004-228639 A | 8/2004 |
| JP | 2005-203893 A | 7/2005 |
| WO | WO 01/22680 A2 | 3/2001 |

OTHER PUBLICATIONS

International Search Report and Written Opinion for PCT/US2006/009210; Date of mailing Jul. 20, 2006.

* cited by examiner

*Primary Examiner*—Erika A Gary
(74) *Attorney, Agent, or Firm*—Myers Bigel Sibley & Sajovec, P.A.

(57) ABSTRACT

Methods of providing broadcast media source tuning information to a remote device from a mobile terminal having a local user interface include receiving a user request to transmit tuning information for a selected broadcast media source from a user interface of the mobile terminal and receiving an identification of the remote device that is to receive the tuning information from the user interface of the mobile terminal. The tuning information is formatted based on a protocol for tuning type information providing for automatic tuning of the receiving remote device to the selected broadcast media source and the formatted tuning information is transmitted to the identified remote device responsive to the user request. The broadcast media source may be a radio and/or a television broadcast and the tuning information may be an associated station identification. Mobile terminals and computer program products are also provided.

24 Claims, 11 Drawing Sheets

MOBILE TERMINALS WITH MEDIA TUNING AND METHODS AND COMPUTER PROGRAM PRODUCTS FOR OPERATING THE SAME

BACKGROUND OF THE INVENTION

The present invention relates to mobile communications devices and more particularly, to mobile terminals including media tuning features and methods and computer program products for operating the same.

Mobile terminals are, typically, primarily purchased by a user to obtain access to wireless phone services through a cellular network telecommunications provider. However, as the processing capabilities, memory and the like included in such mobile terminals increases, an additional level of user functionality is being packaged in such mobile terminals to leverage the benefit to a user of an electronic device that is typically kept with the user at most times. For example, many mobile terminals are currently provided with a camera, allowing pictures to be taken by a user and transmitted from the mobile terminal to others. Another feature incorporated in many mobile terminals currently is a personal digital assistant (PDA) type application suitable for tracking scheduling, tasks and the like for the user. Many mobile terminals also include messaging capability, such as electronic mail (e-mail), short message service (SMS) and multimedia message service (MMS) capabilities.

Another area where additional user functionality is being considered for inclusion in mobile terminals relates to the reception of broadcast media content from different broadcast media sources. For example, a mobile terminal may be provided with a radio tuner capability so as to receive amplitude modulation (AM) and/or frequency modulation (FM) broadcast radio channels by tuning to the station identifier for the radio station of a particular broadcast media source. In addition, protocols have been proposed for transmission of digital television signals, including both video and audio content, to wireless devices, such as mobile terminals. Accordingly, mobile terminals have been proposed that would be configured to be able to receive and display television programming based on tuning to an associated station identifier of a broadcast television media source.

The addition of messaging applications, such as SMS, MMS, e-mail and voice messaging, on mobile terminals has been utilized by users for sending a variety of information to other users. For example, if a userA is watching and/or listening to a radio or TV program that userA believes would be interesting to userB, they may wish to use SMS to send information on the radio or TV channel to userB. However, doing so can be a time-consuming and manual task after a particular station identification is known and available to a receiving user.

By way of exemplary scenario, userA sends a message (such as SMS) to userB listing a suggested radio channel frequency. Once userB receives this message, userB has to manually launch the radio application of their mobile device and tune the radio to the specified particular channel. This operation may be both time-consuming and inconvenient for userB. An alternative approach would be to use a voice call between two users, but such an approach may be expensive as both users will typically be charged minutes for the voice call airtime.

In addition to the time and effort required by the receiving userB for tuning to an identified station, the messaging approach further requires manual activity by the notifying userA through launching a selected messaging application and composing a message containing the radio or television tuning information before sending it to userB. These operations may, as a result, be inconvenient for both userA and userB. Even if both userA and userB are in the same proximity, while the burden on userA for opening an application and launching a message may be avoided by a simple communication to userB without use of the mobile terminal, userB will still have to undertake various operations to tune to the station identified orally by userA.

A further limitation of media tuner/players in mobile terminals is that the quality of the display and/or speakers of the mobile terminal may be limited compared to high-end equipment otherwise owned by a user. Accordingly, when a user returns to their home or the like, they may need to turn on their television and/or stereo equipment, tune to the desired station and then begin listening to the higher quality player source before ceasing to listen to an ongoing program broadcast received by their mobile terminal.

SUMMARY OF THE INVENTION

In some embodiments of the present invention, methods of providing broadcast media source tuning information to a remote device from a mobile terminal having a local user interface include receiving a user request to transmit tuning information for a selected broadcast media source from a user interface of the mobile terminal and receiving an identification of the remote device that is to receive the tuning information from the user interface of the mobile terminal. The tuning information is formatted based on a protocol, more particularly, a protocol configured for tuning type information that provides for automatic tuning of the receiving remote device to the selected broadcast media source, and the formatted tuning information is transmitted to the identified remote device responsive to the user request.

The broadcast media source may be an overair radio and/or a television broadcast that is broadcast without addressing and the tuning information may be an associated station identification. The broadcast media source may be an Internet Protocol (IP) accessible media source and the tuning information may be an address link to the IP accessible media source. In some embodiments where the mobile terminal device sends wishes to provide tuning information associated with an IP address based link, the sending mobile terminal may also have the option of translating this IP information to one or more other formats (such as overair station tuning information) before providing the tuning information to other devices.

In other embodiments of the present invention, the broadcast media source is received at the mobile terminal while receiving the user request. The received user request may be a user request to transmit the tuning information for the broadcast media source currently being received.

In further embodiments, the methods further include detecting an audio and/or video player device in the vicinity of the mobile terminal. The received identification of the remote device may be an identification of the detected audio and/or video device. The tuning information may be transmitted using a localized ad hoc protocol wireless network and the audio and/or video device may be detected using the ad hoc protocol wireless network. The localized ad hoc protocol wireless network may be a Bluetooth protocol network.

In other embodiments of the present invention, the remote device is a second mobile terminal. Transmitting the tuning information may include transmitting the tuning information as a short message service (SMS) message, a multimedia message service (MMS) message and/or an electronic mail (email) message from the first mobile terminal addressed to the second mobile terminal. The tuning information in other embodiments is transmitted over a localized ad hoc protocol communication network detected by the first mobile terminal. The localized ad hoc protocol communication network may be a Bluetooth protocol network, an Institute for Electrical and Electronic Engineers (IEE) 802.11 protocol (also referred to as WiFi) and/or an infrared (IR) port of the first mobile terminal.

In further embodiments of the present invention, receiving the user request includes receiving a request to share tuning information for the currently received broadcast media source. Optional message formats for sharing the tuning information are displayed on a display of the mobile terminal and a selection is received of one of the displayed message formats for use in transmitting the tuning information from the user interface of the mobile terminal. Formatting the tuning information may further include formatting the tuning information as a text message based on the selected message format. The protocol may be a text message format including American Standard Code for Information Interchange (ASCII) alpha-numeric characters for the tuning information and an ASCII non-alpha-numeric character for identifying the text message as containing tuning information. Additional text may be received for inclusion in the text message from the user interface of the first mobile terminal. Formatting the tuning information may includes adding the received additional text in the text message.

In other embodiments, the methods further include receiving the text message including the tuning information at the second mobile terminal. The additional text and/or the tuning information are displayed on a display of the second mobile terminal. A confirmation of acceptance of the received tuning information is received from a user interface of the second mobile terminal responsive to the displayed additional text and/or tuning information. The second mobile terminal is automatically tuned to the broadcast media source based on the received tuning information responsive to receipt of the confirmation.

In further embodiments of the present invention, mobile terminals are provided including a portable housing and a wireless communication network interface circuit in the housing. A user interface circuit coupled to the housing is configured to receive a user request to transmit tuning information for a selected broadcast media source and an identification of the remote device. The mobile terminals further include a controller configured to format the tuning information based on a protocol for tuning type information providing for automatic tuning of the receiving remote device to the selected broadcast media source and to transmit the tuning information to the identified remote device responsive to the user request.

In yet further embodiments of the present invention, the mobile terminal further includes a tuner configured to receive the selected broadcast media source and the user interface circuit is configured to receive the user request to transmit tuning information as a request to transmit tuning information for a broadcast media source being received by the tuner. A localized ad hoc protocol communication network interface may also be provided in the housing and the controller may be configured to transmit the tuning information using the localized ad hoc protocol communication network interface. The remote device may be an audio and/or video player device and the controller may be further configured to detect the audio and/or video player device using the localized ad hoc protocol communication network interface. The remote device may also be a remote mobile terminal and the controller may be configured to transmit the tuning information as a short message service (SMS) message, a multimedia message service (MMS) message and/or an electronic mail (email) message from the mobile terminal addressed to the remote mobile terminal.

In other embodiments of the present invention, the controller is further configured to detect receipt of tuning information at the mobile terminal, receive a confirmation of acceptance of the received tuning information from the user interface circuit of the mobile terminal and automatically tune the tuner to a broadcast media source based on the received tuning information responsive to receipt of the confirmation. The controller may be configured to format the tuning information as a text message based on a selected message format and the protocol may be a text message format including American Standard Code for Information Interchange (ASCII) alpha-numeric characters for the tuning information and an ASCII non-alpha-numeric character for identifying the text message as containing tuning information. The controller may be configured to format the tuning information as a text message and the user interface circuit may be further configured to receive additional text for inclusion in the text message from the user interface of the mobile terminal and the controller may be configured to include the additional text in the text message.

In yet further embodiments of the present invention, methods of automatically tuning a mobile terminal to a broadcast media source based on a received text message are provided. The text message including tuning information and/or additional text is received at the mobile terminal. The text message may be a short message service (SMS) message or a multimedia message service (MMS) message. The tuning information and/or additional text are displayed on a display of the mobile terminal. A confirmation of acceptance of the received tuning information is received from a user interface of the mobile terminal responsive to the displayed tuning information and/or additional text and the mobile terminal is automatically tuned to the broadcast media source based on the received tuning information responsive to receipt of the confirmation. The text message may be a text message format including American Standard Code for Information Interchange (ASCII) alpha-numeric characters for the tuning information and an ASCII non-alpha-numeric character for identifying the text message as containing tuning information.

While described above primarily with reference to apparatus and method aspects, it will be understood that the present invention also includes computer program products for a mobile terminal.

DETAILED DESCRIPTION OF EXEMPLARY EMBODIMENTS

Figure 1:
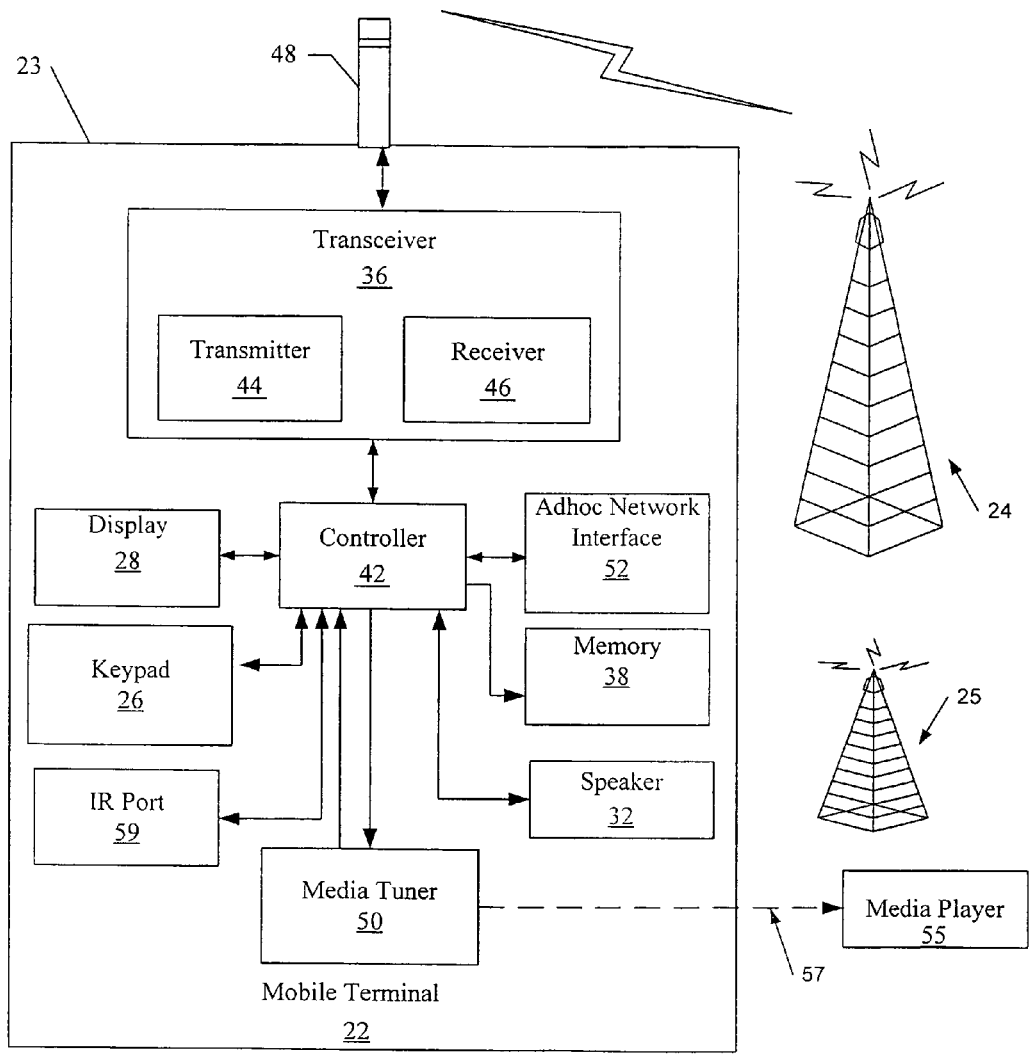
FIG. 1 is a schematic block diagram of a mobile terminal according to some embodiments of the present invention and an exemplary base station transceiver, broadcast media source and media player.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "mobile terminal" includes both devices having only a wireless signal receiver without transmit abilities and devices having both receive and transmit hardware capable of two-way communication over a two-way communication link. Such devices may include cellular or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer, calendar and/or a global positioning system (GPS) receiver; and/or conventional laptop and/or palmtop computers or other appliances, which include a radio frequency receiver. As used herein, "mobile terminals" may be portable, transportable, installed in a vehicle (aeronautical, maritime, or land-based), or situated and/or configured to operate locally and/or in a distributed fashion at any other location(s) on earth and/or in space. As used herein, a "mobile device" includes mobile terminals as well as mobile devices that do not support wireless communications.

Embodiments of the present invention will now be described below with respect to FIGS. 1 through 7c. Referring first to FIG. 1, a schematic block diagram is provided illustrating a mobile terminal including media tuning capabilities in accordance with some embodiments of the present invention. FIG. 1 illustrates a mobile terminal 22 and a base station transceiver 24 of a wireless communications network. A broadcast media source 25 is also schematically shown, such as a radio station or television station broadcast tower, as well as a schematic illustration of a media player 55 in the local vicinity of the mobile terminal 22.

The mobile terminal 22 includes a portable housing 23 and may include, a keypad 26, a display 28, a speaker 32, a microphone 34, a transceiver 36, an infrared (IR) port 59 and a memory 38, any of which may communicate with a controller (processor) 42. Furthermore, the mobile terminal 22 may include a media tuner 50 and a localized ad hoc protocol communications network interface 52, which also communicate with the processor 42. The processor 42 can be any commercially available or custom microprocessor.

The transceiver 36 typically includes a transmitter circuit 44 and a receiver circuit 46, which respectively transmit outgoing radio frequency signals to the base station transceiver 24 and receive incoming radio frequency signals, such as voice call and data signals, from the base station transceiver 24 via an antenna 48. The antenna 48 and the transceiver 36 may also be used to receive signals from the broadcast media source 25 and/or to provide communications to the media player 55 over a localized ad hoc protocol communication network, such as a Bluetooth network, in some embodiments of the present invention, or a separate antenna and/or receiver and/or transmitter may be provided. The antenna 48 may be an embedded antenna, a retractable antenna or any antenna known to those having skill in the art without departing from the scope of the present invention. The radio frequency signals transmitted between the mobile terminal 22 and the base station transceiver 24 may include both traffic and control signals (e.g., paging signals/messages for incoming calls), which are used to establish and maintain a voice call communication with another party or to transmit and/or receive data, such as e-mail, SMS and/or MMS messages, with a remote device. The processor 42 may support various functions of the mobile terminal 22, including functions related to the media tuner 50 and the localized ad hoc protocol communication network interface 52 of the mobile terminal 22 according to some embodiments of the present invention, including some embodiments where the media tuner 50 and the localized ad hoc protocol communication network interface 52 are implemented entirely in the controller 42.

In some embodiments of the present invention, the base station transceiver 24 is a radio transceiver(s) that defines a cell in a cellular network and communicates with the mobile terminal 22 and other mobile terminals in the cell using a radio-link protocol. Although only a single base station transceiver 24 is shown, it will be understood that many base station transceivers may be connected through, for example, a mobile switching center and other devices, to define a wireless communications network.

The media tuner 50 is configured to receive a signal from the broadcast media source 25. In addition, the media tuner 50 may be configured to operate in coordination with the controller 42 in providing tuning information for a selected broadcast media source to remote devices, such as the audio and/or video media player 55 and/or other mobile terminal devices and the like. The controller 42 is configured to format tuning information based on a protocol for tuning type information that provides for automatic tuning of a receiving remote device to a selected broadcast media source associated with the tuning information and to transmit the tuning information to an identified remote device responsive to a user request. The user request and identification of the remote device may be received through a user interface circuit such as the keypad 26 in combination with the controller 42. Examples of protocols for tuning type information providing for automatic tuning of a receiving remote device will be described further with reference to various of the figures herein.

In addition to receiving the designation of the broadcast media source that transmission of tuning information is desired for from the keypad 26, the input from the keypad 26 or other source may designate selection of the broadcast media source currently being received by the media tuner 50. Accordingly, as shown in the schematic block diagram of FIG. 1, the media tuner 50 may be coupled to provide current tuning information to the controller 42 for use in preparing a text message or the like for transmitting tuning type information to a remote device, such as the media player 55 or a remote mobile terminal.

The transmission of the tuning information may be provided through use of the transceiver 36 and/or in cooperation with the ad hoc protocol communication network interface 52 working in cooperation with the controller 42. It will also be understood that transmissions over an ad hoc protocol communication network may utilize the transceiver 36 for physical layer transmission as well as the ad hoc communication network interface 52 for protocol formatting and the like or a separate antenna and transceiver circuit may be provided as part of the ad hoc protocol communication network interface 52. Accordingly, in some embodiments of the present invention, the controller 42 is configured to transmit tuning information utilizing the localized ad hoc protocol communication network interface 52.

In addition, in some embodiments, the controller 42 may also be configured to detect the media player 55 using the localized ad hoc protocol communication network 52. For example, in a Bluetooth protocol communication network, the setup aspects of the protocol provide for identification of available devices to which a connection may be established within the localized region available to the Bluetooth transmitter. A list of the identified media player devices 55 may then be provided to a user as options for the destination remote device as will be described further later herein.

The mobile terminal 22 may also be configured to receive tuning information and automatically tune to a broadcast media source associated with the received turning information. As such, the controller 42 may be configured to detect receipt of tuning information at the mobile terminal, through the transceiver 36 from the base station 24 or from another source, such as the ad hoc protocol communication network interface 52 or other local network interface, such as the IR port 59 of the mobile terminal 22.

The tuning information and/or additional information received with the tuning information may be provided as a prompt to a user, for example, on the display 28, and the controller 42 may be configured to receive a confirmation of acceptance of the received tuning information from the keypad 26. The controller 42 may also be configured to automatically tune the media tuner 50 to the broadcast media source 25 based on the received tuning information responsive to receipt of the confirmation from the user.

Figure 2:
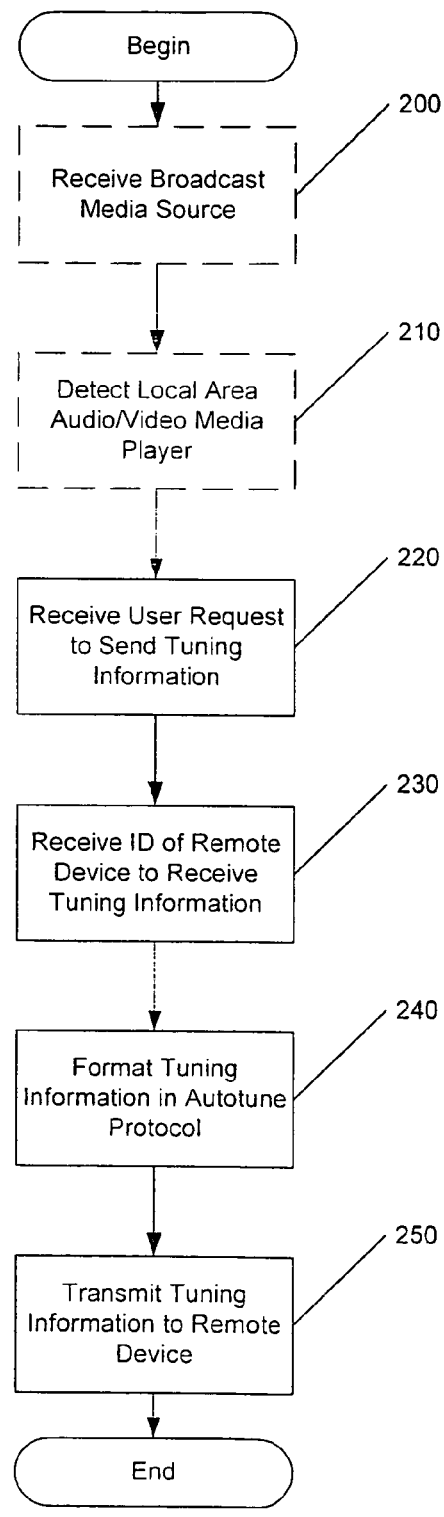
FIG. 2 is a flowchart illustrating methods for providing broadcast media source tuning information to a remote device from a mobile terminal according to some embodiments of the present invention.
Figure 3:
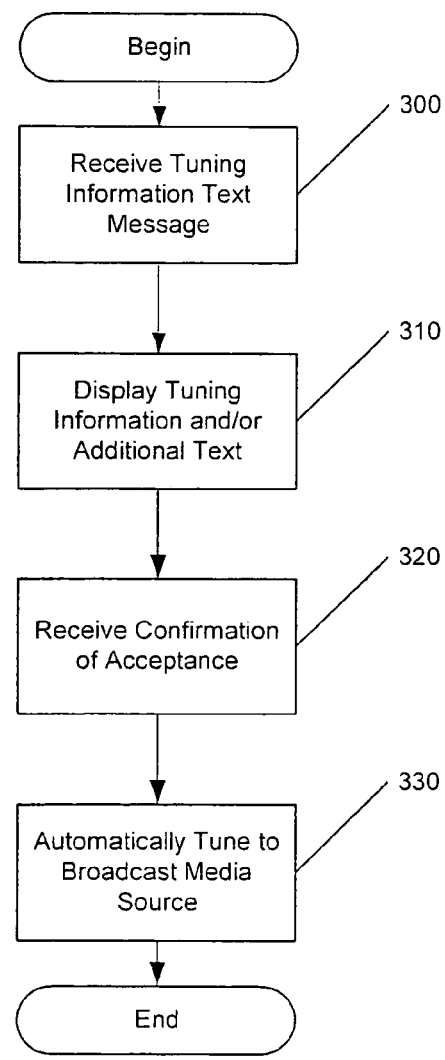
FIG. 3 is a flowchart illustrating methods of automatically tuning a mobile terminal to a broadcast media source based on a received text message according to some embodiments of the present invention.

Methods for providing and/or receiving tuning information according to various embodiments of the present invention will now be described with reference to the flow chart illustrations of FIGS. 2-3. As seen in FIG. 2, operations may begin at Block 200 when a broadcast media source for which tuning information will be transmitted from the mobile terminal is received at the mobile terminal. An audio and/or video player device in the vicinity of the mobile terminal may be detected (block 210). For example, the media player 55 may be detected by the mobile terminal 22 using, for example, the ad hoc protocol local communication network interface 52. It will be understood that, in various embodiments of the present invention, the mobile terminal device transmitting the turning information need not receive the broadcast media source or detect local area media players. A user request to transmit tuning information for a selected broadcast media source is received (block 220). The request may be received, for example, through a keypad 26 of the mobile terminal 22 of the user interface circuit.

An identification of the remote device that is to receive the tuning information is also received (block 230). As with the request to transmit tuning information received at block 220, the identification of the remote device may be received from a user interface circuit local to the mobile terminal 22, such as the keypad 26.

The tuning information is formatted based on a protocol for tuning type information that provides for automatic tuning of the receiving remote device to the selected broadcast media source (block 240). For example, the tuning information in some embodiments is formatted as a text message. More particularly, the text message format may include American Standard Code for Information Interchange (ASCII) alphanumeric characters for the tuning information and ASCII non-alpha-numeric character(s) for identifying a text message as containing tuning information. The non-alpha-numeric character(s) may be recognized at the receiving device and trigger processing of the tuning information for automatic tuning at the receiving device. In addition, additional text information may be received from a requesting user at block 220 and/or block 230 and the additional text information may also be incorporated into the formatted text message at block 240.

In some embodiments of the present invention, a user may be given the option to specify a format used for transmitting the turning information. For example, a user may select use of a short message service (SMS) message, a multimedia message service (MMS) message and/or an electronic mail (e-mail) message from the mobile terminal addressed to the remote device as a channel for communicating the protocol formatted tuning information. Accordingly, formatting operations at block 240 may include formatting the text message for transmission using the message service selected by the user.

The tuning information is transmitted to the identified remote device after formatting responsive to the user request (block 250). In some embodiments of the present invention, the tuning information is transmitted using a localized ad hoc protocol wireless network at block 250. The localized ad hoc protocol wireless network may be, for example, a Bluetooth protocol network. In other embodiments, an available localized ad hoc protocol communication network detected by the mobile terminal may be associated with an infrared (IR) port of the mobile terminal.

In some embodiments of the present invention where a broadcast media source is received by the mobile terminal at block 200, a user request received at block 220 may be a user request to transmit tuning information for a broadcast media source currently being received by the mobile terminal. The broadcast media source may be, for example, a radio and/or a television broadcast and the tuning information may be an associated station identification for the radio and/or television broadcast. The remote device, in some embodiments, may be an audio and/or video player device or a remote mobile terminal. In some embodiments where the remote device receiving the tuning information is an audio and/or video player device, the availability of the remote device may be detected using the ad hoc protocol wireless network and tuning information may be transmitted to the detected and designated remote device using the ad hoc protocol wireless network. Similarly, a remote mobile terminal may be available for communication over such an ad hoc protocol wireless network as an alternative to a messaging service, such as SMS, that utilizes a cellular telephone communication network provider.

Methods for automatically tuning a mobile terminal to a broadcast media source based on received turning information according to some embodiments of the present invention will now be described with reference to the flowchart illustration of FIG. 3. As illustrated in FIG. 3, operations begin at block 300 with receipt by the mobile terminal of the tuning information (block 300). For example, the tuning information may be received as part of a text message, such as a short message service (SMS) message or a multimedia message service (MMS) message. The received text message may include additional text as well as the tuning information. In some embodiments of the present invention, the received text message at block 300 is formatted using a tuning information protocol including ASCII alpha-numeric characters for the tuning information and an ASCII non-alpha-numeric character that identifies the text message as containing tuning information, which may be utilized by the receiving mobile terminal to trigger automated tuning to the designated broadcast media source associated with the tuning information in a text message.

The tuning information and/or additional text from the text message are displayed on the display of the mobile terminal (block 310). A confirmation of acceptance of the received tuning information may be received, for example, from a user interface of the mobile terminal, responsive to the displayed tuning information and/or additional text (block 320). The mobile terminal is automatically tuned to the broadcast media source associated with the tuning information based on the received tuning information responsive to receipt of the confirmation (block 330). However, it will be understood that in some embodiments, autotuning at block 330 may be provided without requiring display or confirmation operations as described for blocks 310 and 320.

Figure 4A:
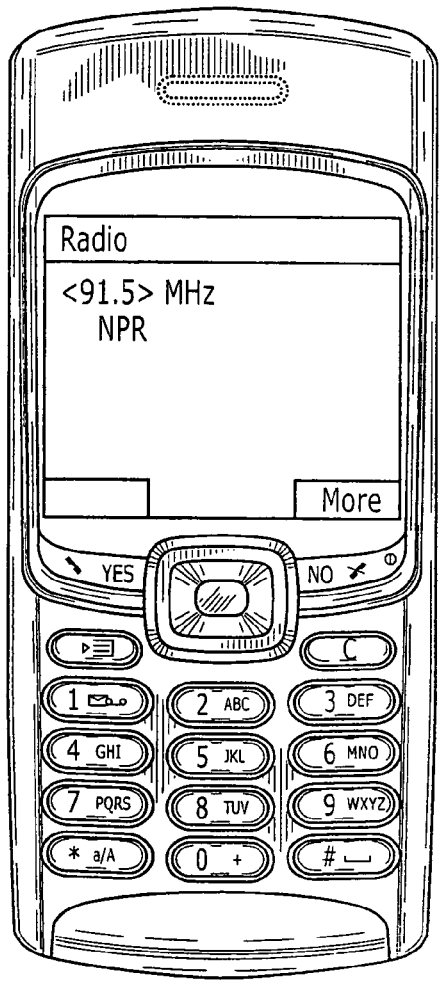
FIGS. 4a-4d are schematic diagrams of graphic user interface (GUI) displays of a mobile terminal for a user sending tuning information to a remote device according to some embodiments of the present invention.

Various embodiments of the present invention will now be further described with reference to the schematic illustrations of FIGS. 4a-4d. Embodiments illustrated in FIGS. 4a-4d correspond to a tuner message operability for a mobile terminal providing users of a mobile terminal including a radio and/or TV tuning application the option to potentially quickly and readily share or send radio or TV channel station information to other users using messaging methods, such as SMS, MMS or the like. As shown in FIG. 4a, a user is listening to a favorite program on their mobile terminal and the display of the mobile terminal shows that they are listening to a radio station designated as "NPR" at a tuning frequency of 91.5 megahertz (MHz) in the illustrative example of FIG. 4a.

Figure 4B:
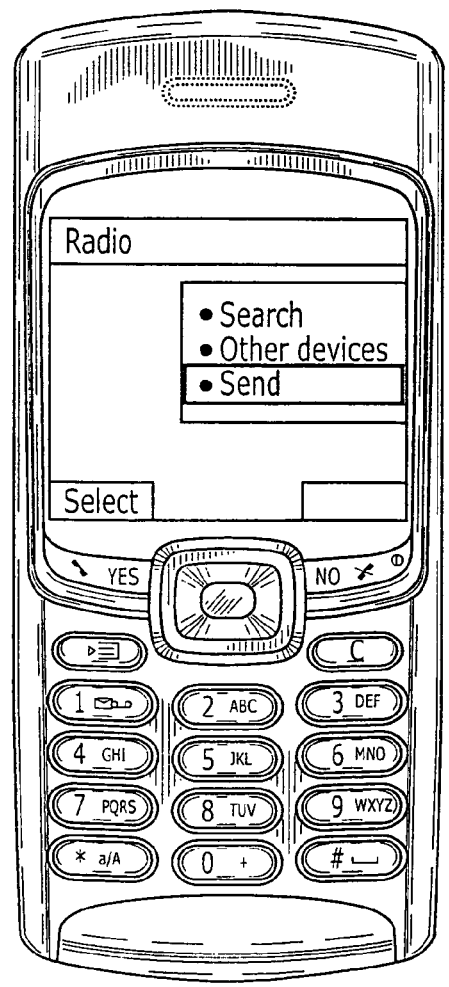

When the user desires to transmit tuning information using the tuner message feature, the "more" option is selected from the display of FIG. 4a, which provides a user various options, such as those illustrated in FIG. 4b. As shown in FIG. 4b, the user may select a "Search" option for potential recipients of the tuning information, an "Other device" option for selecting known recipient devices from a contacts or other list maintained on the mobile terminal by the user and a "Send" option, which is shown as highlighted in FIG. 4b.

Figure 4C:
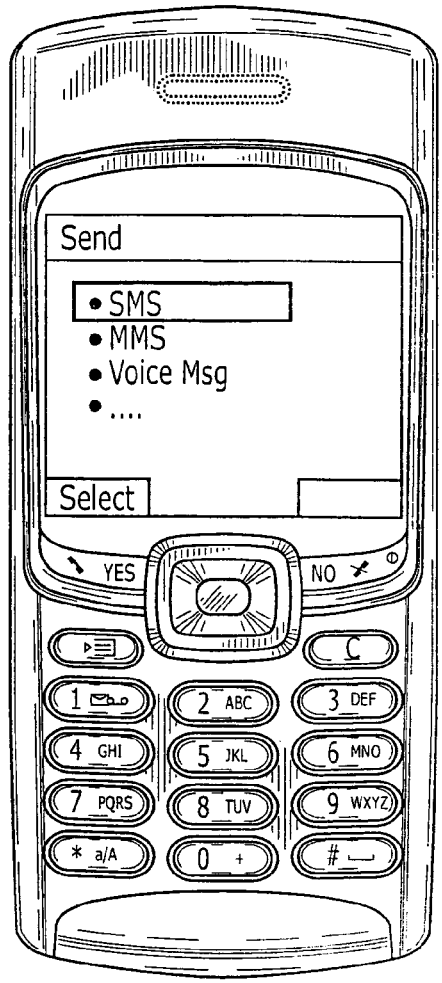

When the user selects the "Send" option shown in FIG. 4b, a display such as that illustrated in FIG. 4c may be provided to the user. The display of FIG. 4c provides the user the option of selecting a particular message type for use in transmitting the tuning information. As shown in FIG. 4c, the "SMS" option is highlighted and is selected by a user using the "Select" display in FIG. 4c, after which the display shown in FIG. 4d may be provided to the user.

Figure 4D:

As seen in FIG. 4d, after selecting a message format option, the user is provided with a text entry page including preformatted information associated with the broadcast media station currently being listened to by the user (i.e., "Radio CH:91.5 MHz"). As also seen in FIG. 4d, the user has the option to add personalized additional message information before sending the message, illustrated as "Hey Vickie, go to this channel" in FIG. 4d. When the user selects the "Send" display option in FIG. 4d, the formatted message will be sent to a recipient designated by a user of the mobile terminal.

Accordingly, in some embodiments of the present invention, when a userA exercises a text messaging option, the selected SMS, MMS or the like application may be automatically launched with a pre-composed message ready to be sent. The pre-composed message may contain all the required information for a recipient userB to tune their radio to the channel in question. UserA may append additional information if desired before sending a message and the pre-composed message may contain the required information in a pre-defined protocol scheme, based upon which userB may automatically tune their radio instantly to the designated channel from the message. As such, some embodiments of the present invention provide a user the ability to quickly and readily facilitate easy sharing of tuning information related to a radio/TV program being played on the user's mobile terminal using an available messaging method of the mobile terminal.

Methods of automatically tuning or receiving mobile terminals to a broadcast media source based on a received message, such as a text message, will now be further described with reference to the schematic illustrations of FIGS. 5a-5d. FIGS. 5a-5d illustrate an exemplary autotuner message handler feature that may be provided on a mobile terminal device to receive and process messages, such as those generated by the embodiments described with reference to FIGS. 4a-4d. As will be described, a receiving user may be able to use the channel program information embedded in a message received by their device to automatically open the radio/TV receiving application on their mobile terminal and autotune to view the designated program. Using this feature, the messaging client application on the receiving mobile terminal may be configured to parse channel information within the message and, if valid information is found, this parsing would allow the related application (radio and/or TV) to be launched for use. For example, when a user gets a message containing related information for a radio channel program, the messaging application in the recipient's mobile terminal may recognize the channel information in the message and automatically (or automatically after first obtaining user confirmation) launch the radio application and automatically tune to the station identified in the received message. This may eliminate or at least limit the manual intervention required by the receiving user to execute the procedure.

The pre-defined tag or message mechanism can be defined by the formatting protocol used in creating the tuning information message. In other words, instead of the transmitting user sending the tuning information in a simple text format, it may be formatted using a predefined protocol and then included in the message. By way of example with reference to FIGS. 4a-4d and FIGS. 5a-5d, the format may be "Radio-CH:FM:91.5." An exemplary sequence of user screens for such an autotuner message handler will now be described with reference to FIGS. 5a-5d.

Figure 5A:
FIGS. 5a-5d are schematic diagrams of GUI displays of a mobile terminal for a user receiving a text message including media tuning information.

As seen in the schematic illustration of FIG. 5a, a user receives an SMS message at their mobile terminal and a new message notification is displayed on the display screen of the mobile terminal that provides the user the option of viewing the new message. The receiving user's mobile terminal may be, for example, in a stand-by mode when the message is received.

Figure 5B:
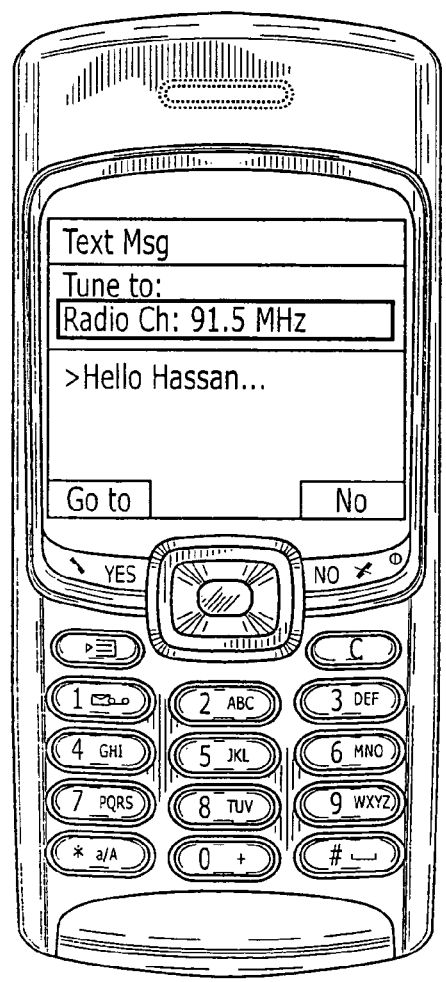

After the user requests viewing of the message, the display of FIG. 5b may be provided, which gives information from the text message as well as a prompt requesting confirmation for launch of the radio application using autotuning to the channel designated in the message. Thus, as seen in FIG. 5b the display may include information identifying the proposed radio channel, and additional information from the sender of the message that may be useful to the recipient. On selecting the "Go to" option on the display of FIG. 5b to launch the radio application, the radio program on the recipient's mobile terminal will be launched and tuned to the designated radio station and the display of FIG. 5d will be provided showing the user that the radio program is active and tuned to "NPR" at 91.5 MHz.

Figure 5C:
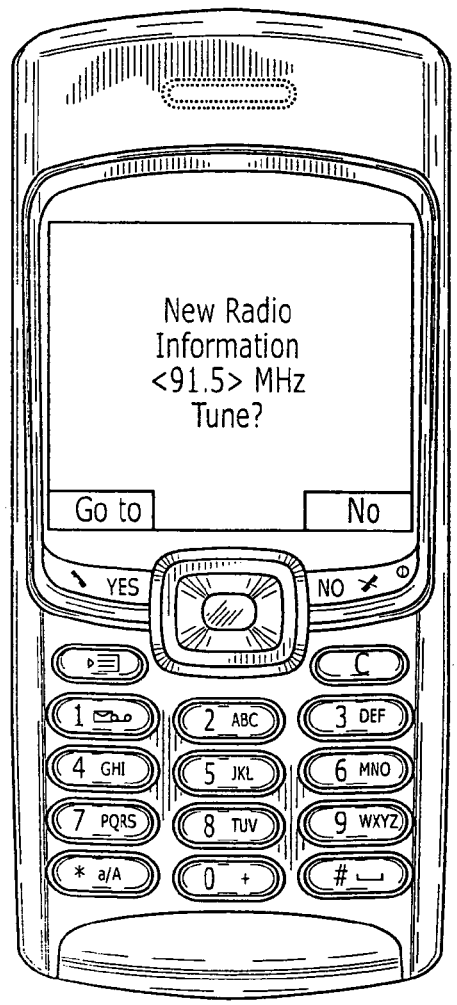
Figure 5D:
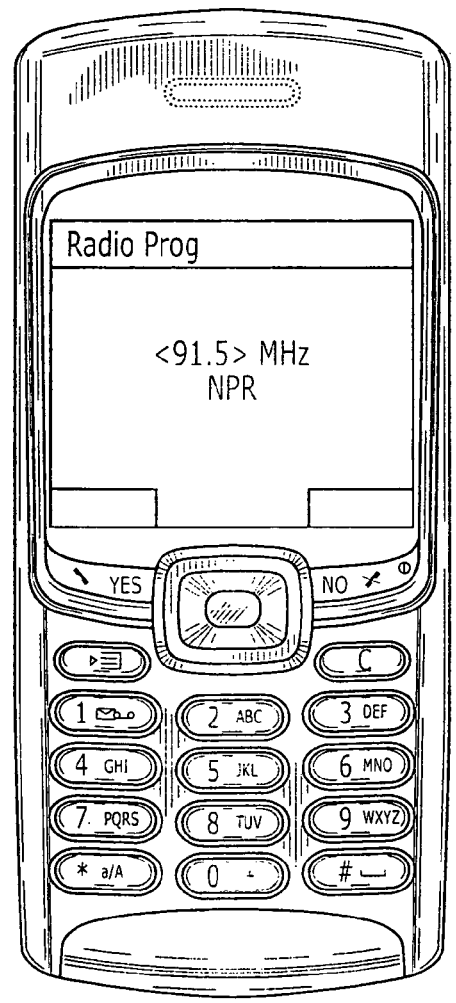

In some embodiments of the present invention, the sequence of display screens shown in FIGS. 5a and 5b may be replaced by the use of the screen of FIG. 5c. The message handling application at the receiving mobile terminal may be configured to do parsing of a received message automatically on receipt of the message to identify tagging information defined by the autotuner message protocol that designates a received message as containing radio and/or TV tuning information for use in autotuning at the receiving mobile terminal. Thus, information may be automatically initially analyzed by the messaging application of the receiving mobile terminal so that the first display after receipt to a user directly identifies the included radio information and provides the receiving user the option to confirm a desire to listen to the identified station and automatically launch the relevant application on the mobile terminal and tune to the designated station using the protocol coded tuning information contained in the received message. As noted previously, the message handling application may also launch and provide tuning information to the tuning application without requesting user confirmation.

Operations related to transmitting and receiving tuning information between terminals in a localized area according to further embodiments of the present invention will now be described with reference to the schematic illustrations of FIGS. 6a-6e. For the embodiments illustrated in FIGS. 6a-6e, a tuning information message capability may be incorporated, for example, in the radio/television tuning application of a mobile terminal device to allow a user to directly share tuning associated channel information using a local wireless protocol application to transmit the information to another device in the proximity of the mobile terminal. A local wireless protocol application may be, for example, infrared, Bluetooth, or the like. When the user exercises this option, their mobile terminal device may send the required information locally to other mobile terminal devices within the coverage area of the utilized local wireless protocol connection (i.e., in the proximity of the user).

The receiving device may receive the tuning information and present it to a user of the receiving mobile terminal, for example, as a pop-up display screen with options such as "Yes" or "No." "No" may be used to reject the information and "Yes" may be used to start the radio application and automatically tune to the station associated with the received tuning information.

Tuning and launching of the local radio application at the receiving device may be initiated before receiving confirmation from a user of acceptance and the pop-up screen may give the receiving user the option to override and turn off the radio application. In some embodiments, the user may have the option of selectively configuring their mobile terminal to select between requiring user confirmation before launch of the media tuning application on the mobile terminal or to provide for automatic launching of the media tuning application on the mobile terminal without user confirmation.

Figure 6A:
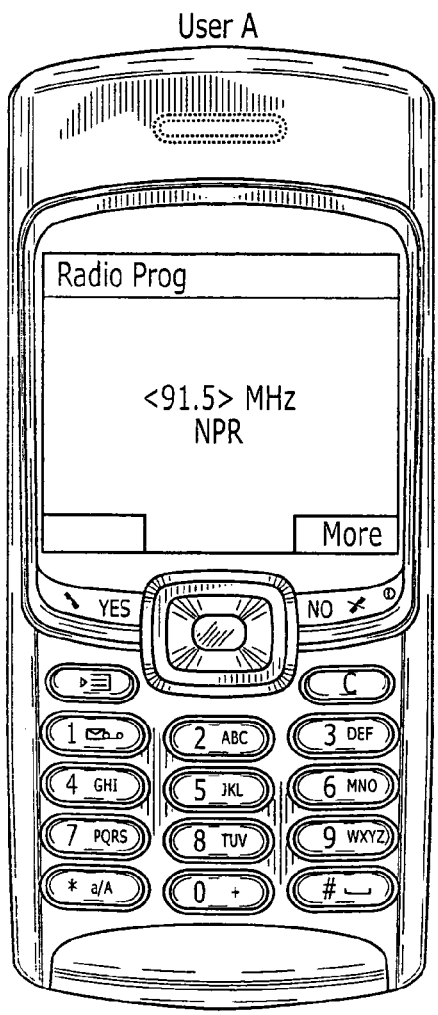
FIGS. 6a-6e are schematic diagrams illustrating GUI displays of a mobile terminal for a user transmitting tuning information and a receiving user tuning to the received media content designated by the turning information according to some embodiments of the present invention.
Figure 6B:
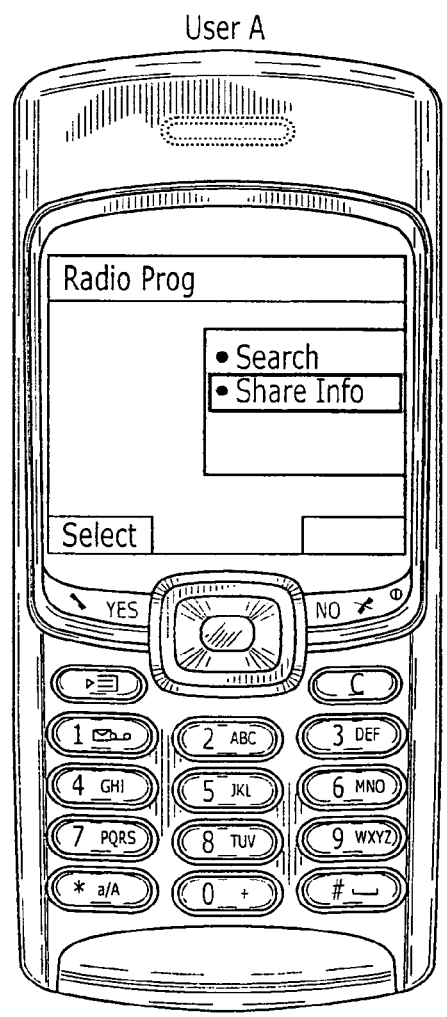
Figure 6C:
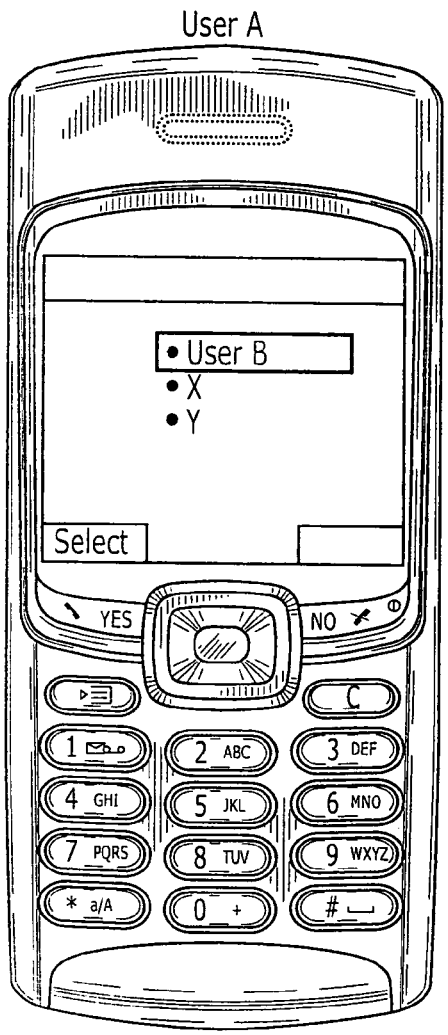

Referring now to the schematic illustration of FIG. 6a, a sending userA is listening to a radio station, NPR 91.5, on their mobile terminal. UserA selects a "More" option shown in the display of FIG. 6a and is provided the display illustrated in FIG. 6b. The display of FIG. 6b provides a "Search" and a "Share info" option to the user. When the "share info" option is highlighted and the user selects the "Select" option of the display of FIG. 6b, the display in FIG. 6c is provided to the user. The "Search" option of the display screen of FIG. 6b may be utilized to identify potential recipient mobile terminal devices or the like in the proximity of the mobile terminal of userA.

As seen in the display of FIG. 6c, a listing of available recipients for the tuning information is provided to the user. With the userB selection highlighted, userA may use the "Select" option of the display of FIG. 6c to initiate sending of information for the radio channel to the designated userB.

Figure 6D:
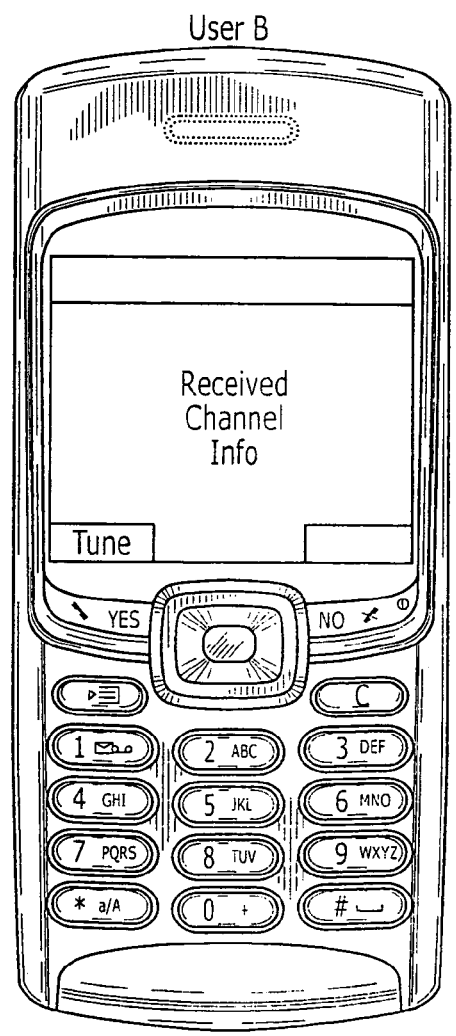
Figure 6E:
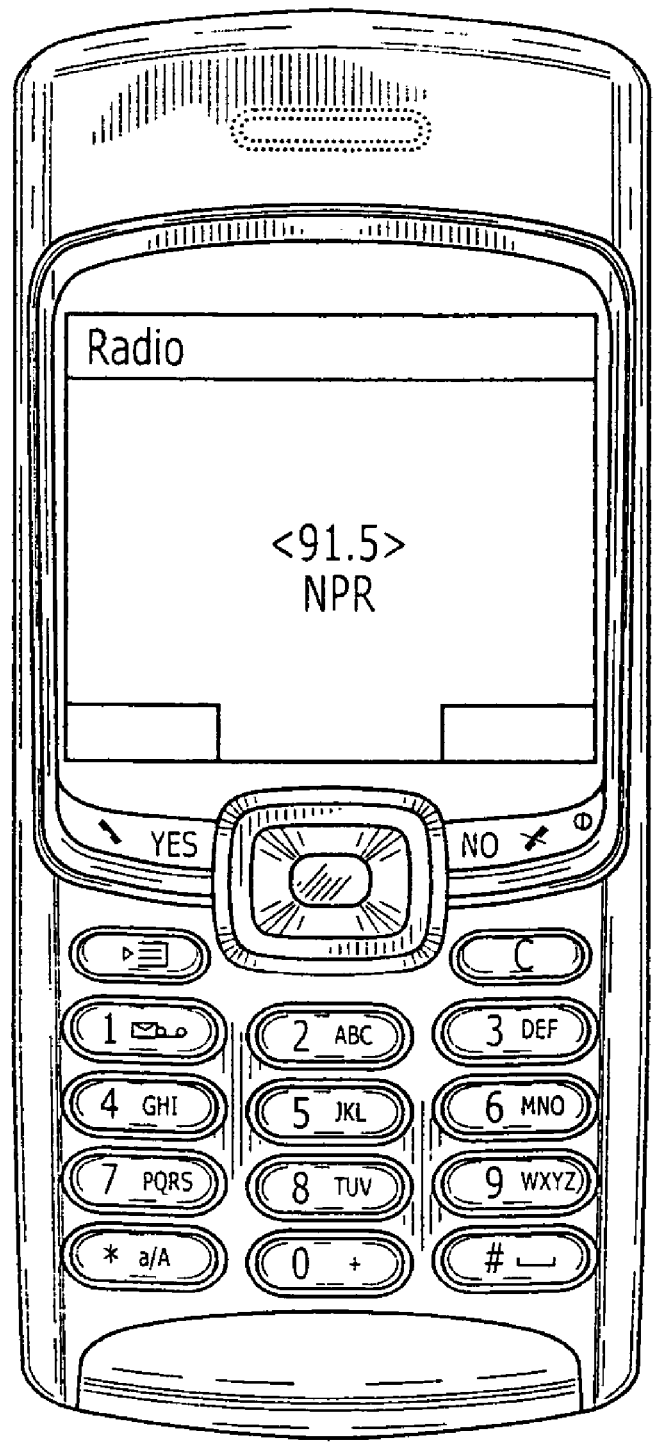

As shown in FIG. 6d, the receiving userB is provided a display notification that the channel information has been received and a "Tune" option to confirm that userB desires tuning to the designated channel in the received message. When tuning is selected, as seen in FIG. 6e, the radio tuner application of userB's mobile terminal is launched responsive to userB's selection of the "Tune" option of the display of FIG. 6d and tuned to the designated station based on the tuning information received by userB.

While the description of the examples shown in FIGS. 4a-6e relate to a particular radio station (NPR), it will be understood that other broadcast media sources having associated tuning information may be processed in a substantially similar manner as described with reference to a radio station in these figures. Similarly, the protocol utilized in formatting the tuning information message may account for different types of broadcast media sources and provide associated tagging of the protocol formatted message so that a receiving device may determine not only the frequency tuning information but the type of media source associated with the tuning information. This may allow a receiving device to select an appropriate local media tuning application to launch.

In some embodiments, the broadcast source may be an IP addressable media source being accessed by a user of a mobile terminal using a browser application of the mobile terminal and the tuning information may be provided to automatically launch a browser to access the IP addressable media source on the remote device, such as a wireless access protocol (WAP) browser of another terminal or a browser of a computer accessible locally to the source mobile terminal over a Bluetooth protocol network or the like.

As described with reference to FIGS. 6a-6f, various embodiments of the present invention may provide a local radio/TV channel commander that may package radio/TV channel information into a communicatable object that will be recognizable and exchangeable with other devices. The channel information can be packaged into a defined object, similar to a vNote object, that can be exchanged using a local connectivity protocol, such as Bluetooth. This may enable quick and easy sharing of radio/TV channel information that may make associated radio/TV tuning applications in mobile terminals more useful and enjoyable for a user.

Further embodiments of the present invention will now be described with reference to the schematic illustrations of FIGS. 7a-7c. The embodiments illustrated in FIGS. 7a-7c may be applicable to mobile terminal users who wish to continue listening to radio/TV broadcast transmissions played on their mobile terminals on other radio/TV tuning systems that are available and are capable of stereo and/or other enhanced functionality or the like for playing of the broadcast media. More particularly, such tuning of the alternate stereo or the like may be provided without requiring the user to manually tune the other tuning/playing device. For example, the user may be listening to their favorite radio station on their mobile phone and then enter their car, which may have superior stereo equipment to the mobile terminal's. Thus, a user may desire to tune the car radio to the same station as that to which the mobile terminal is currently tuned. Similarly, a user may enter their home or office premises listening to a desired radio station on their mobile terminal and wish to listen to the same station on stereo equipment found in their home or office.

Figure 7A:
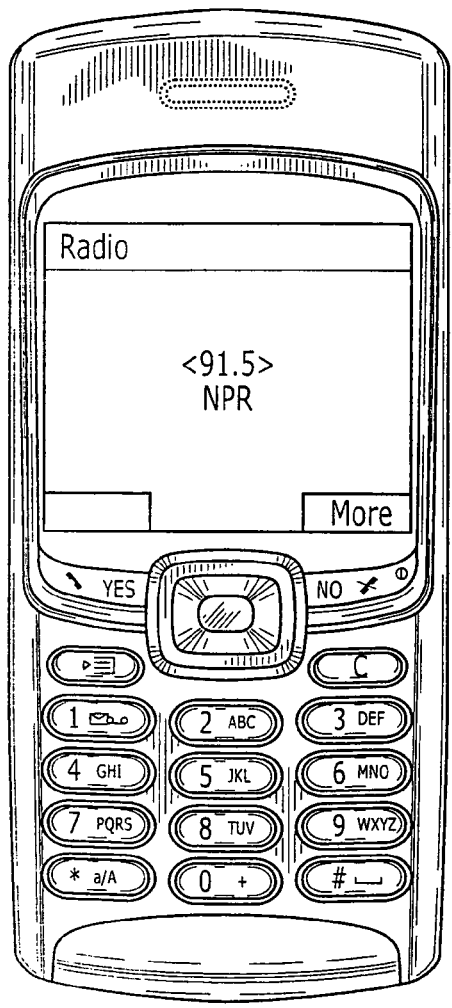
FIGS. 7a-7c are schematic diagrams illustrating GUI displays of a mobile terminal for a user sending tuning information to an audio/video media tuner in the proximity of the mobile terminal according to some embodiments of the present invention.
Figure 7B:
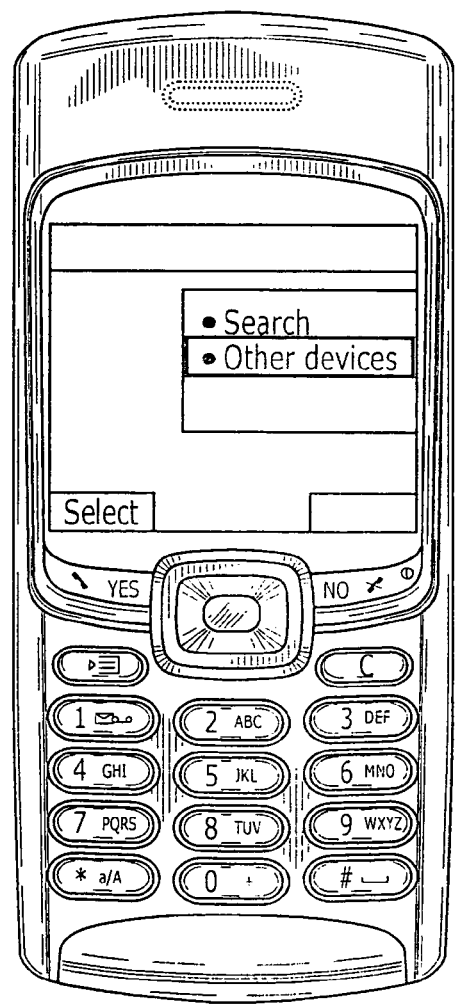
Figure 7C:
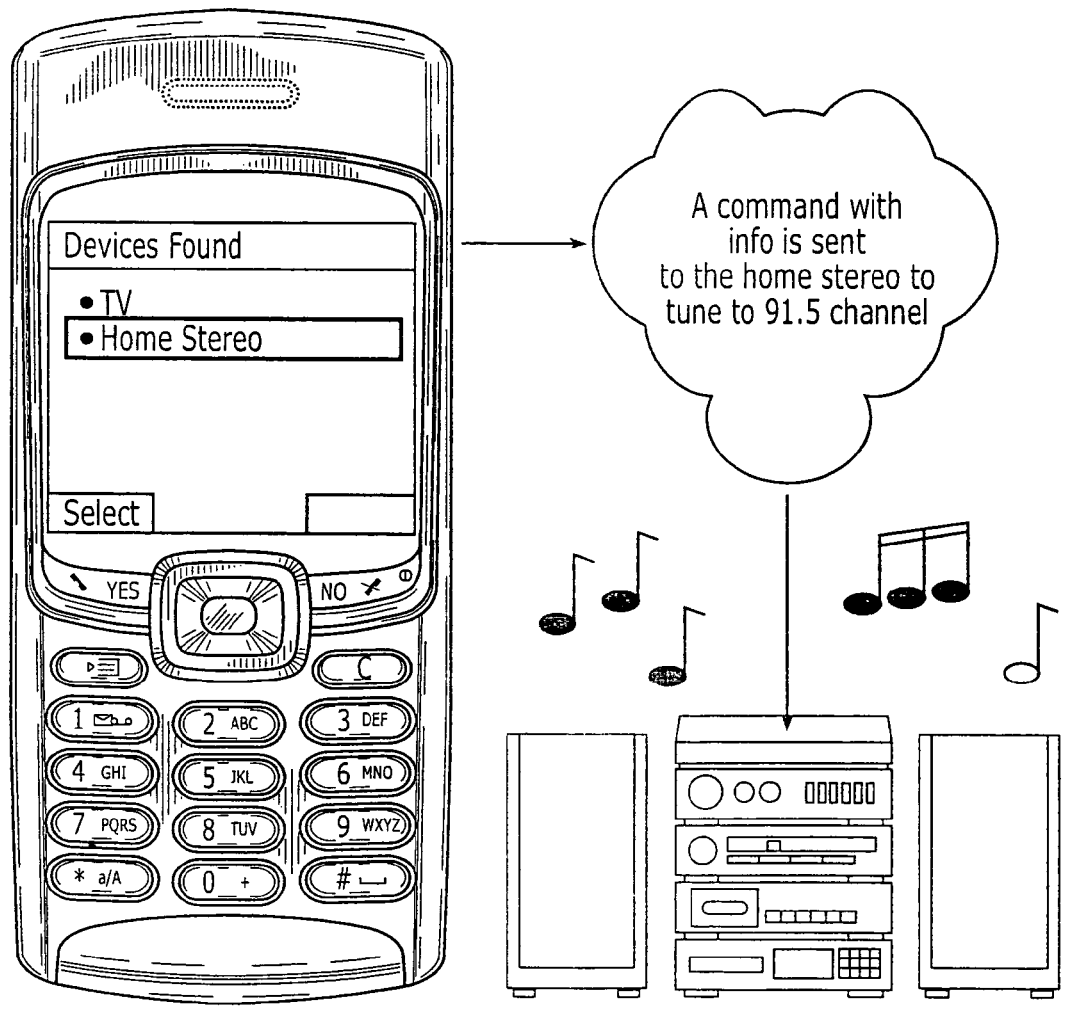

As illustrated in the schematic diagrams of FIGS. 7a-7c, a mobile terminal in some embodiments of the present invention is provided with a remote channel commander feature that a user may use to share radio/TV channel information with other devices, for example, by beaming the tuning information of the wireless mobile terminal directly to such devices. The other devices may be a home stereo, car music system or the like and may automatically tune to the desired channel when they receive the information. Accordingly, the communication may be provided using a local connectivity protocol, such as Bluetooth or a similar protocol, in a prescribed protocol format for the tuning information as will be illustrated by the examples of FIG. 7a-7c.

The illustrated remote channel commander feature may make it more convenient for users to enjoy/share their listening/viewing experience for a radio/TV program played on their mobile terminal device by commanding (sending) associated channel information to other audio/video systems to start, tune and play the same program as is playing on their mobile terminal device. As such, a user may be able to readily continue to listen to/view their favorite programs on other devices they may prefer for various reasons.

As shown in the illustration of FIG. 7a, a mobile terminal of a user is tuned to a radio station (NPR) that is enjoyed by the listening user while they are, for example, walking from a bus station toward their home. When the user arrives at their home, or other location having an alternative radio playing device, the user starts the remote channel commander feature by selecting the "More" option in the screen of FIG. 7a. As seen in the display of FIG. 7b, the user may then be given the option to "Search" for available alternate remote devices or select "Other devices." When the "Other devices" option is highlighted as shown in FIG. 7b and the "Select" option of FIG. 7b is selected, the display of FIG. 7c may be provided to the user.

As seen in FIG. 7c, both the TV and home stereo device are shown as found and available for use by a user. When the user selects the "Select" option from the screen of FIG. 7c, a command with the tuning information is formatted and sent to the selected home stereo to tune to the NPR channel currently being listened to on the mobile terminal. The designated channel may then start playing on the home stereo receiving the command.

As will be appreciated by one of skill in the art, the present invention may be embodied as a method, system, or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. The program code may execute entirely on the user's computer (i.e., controller of the user's mobile terminal), partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention was described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and schematic diagrams of FIGS. 1-7c illustrate the architecture, functionality, and operations of some embodiments of methods, systems, and computer program products for media tuning. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

The invention claimed is:

1. A method for providing broadcast media source tuning information to a remote device from a mobile terminal having a local user interface, comprising:
    detecting an audio and/or video player device in the vicinity of the mobile terminal;
    receiving a user request to transmit tuning information for a selected broadcast media source from a user interface of the mobile terminal;
    receiving an identification of the detected audio and/or video device as the remote device that is to receive the tuning information from the user interface of the mobile terminal;
    formatting the tuning information based on a protocol for tuning type information providing for automatic tuning of the receiving remote device to the selected broadcast media source; and
    transmitting the tuning information to the identified remote device responsive to the user request, wherein transmitting the tuning information comprises transmitting the tuning information using a localized ad hoc protocol wireless network and wherein detecting the audio and/or video device comprises detecting the audio and/or video device using the ad hoc wireless network,
    wherein the audio and/or video player device is not a mobile terminal and comprises a higher quality player device than the mobile terminal providing the broadcast media source tuning information.

2. The method of claim 1, further comprising receiving the broadcast media source at the mobile terminal while receiving the user request and wherein receiving the user request comprises receiving a user request to transmit the tuning information for the broadcast media source currently being received.

3. The method of claim 2, wherein the broadcast media source comprises a radio and/or a television broadcast and the tuning information comprises an associated station identification.

4. The method of claim 3, wherein the mobile terminal comprises a first mobile terminal and wherein the detected audio and/or video device comprises a second mobile terminal.

5. The method of claim 4, wherein transmitting the tuning information comprises transmitting the tuning information as a short message service (SMS) message, a multimedia message service (MMS) message and/or an electronic mail (email) message from the first mobile terminal addressed to the second mobile terminal.

6. The method of claim 4, wherein transmitting the tuning information comprises transmitting the tuning information over a localized ad hoc protocol communication network detected by the first mobile terminal.

7. The method of claim 6, wherein the localized ad hoc protocol communication network comprises a Bluetooth protocol network and/or an infrared (IR) port of the first mobile terminal.

8. The method of claim 4, wherein receiving the user request comprises:
    receiving a request to share tuning information for the currently received broadcast media source;
    displaying optional message formats for sharing the tuning information on a display of the mobile terminal; and
    receiving a selection of one of the displayed message formats for use in transmitting the tuning information from the user interface of the mobile terminal.

9. The method of claim 8, wherein formatting the tuning information further comprises formatting the tuning information as a text message based on the selected message format and wherein the protocol comprises a text message format including American Standard Code for Information Interchange (ASCII) alpha-numeric characters for the tuning information and an ASCII non-alpha-numeric character for identifying the text message as containing tuning information.

10. The method of claim 9, further comprising receiving additional text for inclusion in the text message from the user interface of the first mobile terminal and wherein formatting the tuning information includes including the received additional text in the text message.

11. The method of claim 10 wherein the method further comprises:
    receiving the text message including the tuning information at the second mobile terminal;
    displaying the additional text and/or the tuning information on a display of the second mobile terminal;
    receiving a confirmation of acceptance of the received tuning information from a user interface of the second mobile terminal responsive to the displayed additional text and/or tuning information; and
    automatically tuning the second mobile terminal to the broadcast media source based on the received tuning information responsive to receipt of the confirmation.

12. The method of claim 4 wherein the method further comprises:
    receiving the tuning information at the second mobile terminal;
    receiving a confirmation of acceptance of the received tuning information from a user interface of the second mobile terminal; and automatically tuning the second mobile terminal to the broadcast media source based on the received tuning information responsive to receipt of the confirmation.

13. The method of claim 4 wherein the tuning information in the user request comprises Internet Protocol (IP) address information and wherein formatting the information comprises translating the IP address information to an alternative form of tuning information not including IP address information.

14. A computer program product for providing broadcast media source tuning information to a remote device from a mobile terminal having a local user interface, the computer program product comprising computer program code embodied in a computer readable medium, the computer program code comprising program code configured to carry out the method of claim 4.

15. The method of claim 1, wherein the localized ad hoc protocol wireless network comprises a Bluetooth protocol network.

16. A computer program product for providing broadcast media source tuning information to a remote device from a mobile terminal having a local user interface, the computer program product comprising computer program code embodied in a non-transitory computer readable medium, the computer program code comprising program code configured to carry out the method of claim 1.

17. The method of claim 1, wherein the audio and/or video player device is a television and/or stereo equipment.

18. The method of claim 1, wherein the mobile terminal is associated with a user and wherein the audio and/or video player device is not associated with any user different from the user associated with the mobile terminal.

19. The method of claim 1, wherein detecting the audio and/or video player device comprises detecting the audio and/or video device before receiving any associated identification information for the detected audio and/or video device from a user of the mobile terminal.

20. A mobile terminal, comprising:
a portable housing;
a wireless communication network interface circuit in the housing;
a user interface circuit coupled to the housing configured to receive a user request to transmit tuning information for a selected broadcast media source and an identification of a receiving remote device;
a controller configured to format the tuning information based on a protocol for tuning type information providing for automatic tuning of the receiving remote device to the selected broadcast media source and to transmit the tuning information to the identified receiving remote device responsive to the user request, wherein the controller is further configured to automatically detect an audio and/or video player device using a localized ad hoc protocol communication network interface and wherein the user interface circuit is configured to receive an identification of the detected audio and/or video player device as the identification of the remote device, wherein the localized ad hoc protocol communication network interface is in the housing and wherein the controller is configured to transmit the tuning information using the localized ad hoc protocol communication network interface,
wherein the audio and/or video player device is not a mobile terminal and comprises a higher quality player device than the mobile terminal providing the broadcast media source tuning information.

21. The mobile terminal of claim 20, wherein the mobile terminal further comprises a tuner configured to receive the selected broadcast media source and wherein the user interface circuit is configured to receive the user request to transmit tuning information as a request to transmit tuning information for a broadcast media source being received by the tuner.

22. The mobile terminal of claim 21, wherein the controller is further configured to:
detect receipt of tuning information at the mobile terminal;
receive a confirmation of acceptance of the received tuning information from the user interface circuit of the mobile terminal; and
automatically tune the tuner to a broadcast media source based on the received tuning information responsive to receipt of the confirmation.

23. The mobile terminal of claim 20, wherein the controller is configured to format the tuning information as a text message based on a selected message format and wherein the protocol comprises a text message format including American Standard Code for Information Interchange (ASCII) alpha-numeric characters for the tuning information and an ASCII non-alpha-numeric character for identifying the text message as containing tuning information.

24. The mobile terminal of claim 20, wherein the controller is configured to format the tuning information as a text message and wherein the user interface circuit is further configured to receive additional text for inclusion in the text message from the user interface of the mobile terminal wherein the controller is configured to include the additional text in the text message.

* * * * *